United States Patent
Warner

[15] 3,659,872
[45] May 2, 1972

[54] FOLDABLE COVER STRUCTURE FOR MOTORCYCLE

[72] Inventor: Leroy Warner, Box 109, Independence, Mo. 64051

[22] Filed: June 26, 1970

[21] Appl. No.: 50,107

[52] U.S. Cl. ............................................. 280/289, 296/78.1
[51] Int. Cl. ................................................................ B62j 19/00
[58] Field of Search ........................ 280/289; 296/78.1, 136; 160/19

[56] References Cited

FOREIGN PATENTS OR APPLICATIONS

| | | | |
|---|---|---|---|
| 558,022 | 2/1957 | Italy | 296/78.1 |
| 528,460 | 5/1954 | Belgium | 296/136 |
| 487,299 | 11/1953 | Italy | 296/136 |
| 937,747 | 1/1956 | Germany | 296/78.1 |
| 635,334 | 9/1934 | Germany | 296/78.1 |

*Primary Examiner*—Kenneth H. Betts
*Attorney*—Schmidt, Johnson, Hovey & Williams

[57] ABSTRACT

A protective cover for a two-wheeled cycle having a pair of handlebars includes a pair of flexible panels which surround and overlie the cycle. An opening in one of the panels receives the handlebars, and a third flexible panel closes this opening. The third panel has first and second sections which present slits for receiving the individual bars of the pair of handlebars, and means on each section is provided for securing each section in close surrounding relationship to a respective handlebar. A plurality of fasteners around the periphery of the third panel secure the latter to the first and second panels and additional fasteners are provided at the front and rear of the cycle for securing the vertical side portions of that panel which surrounds the cycle.

4 Claims, 4 Drawing Figures

Patented May 2, 1972
3,659,872
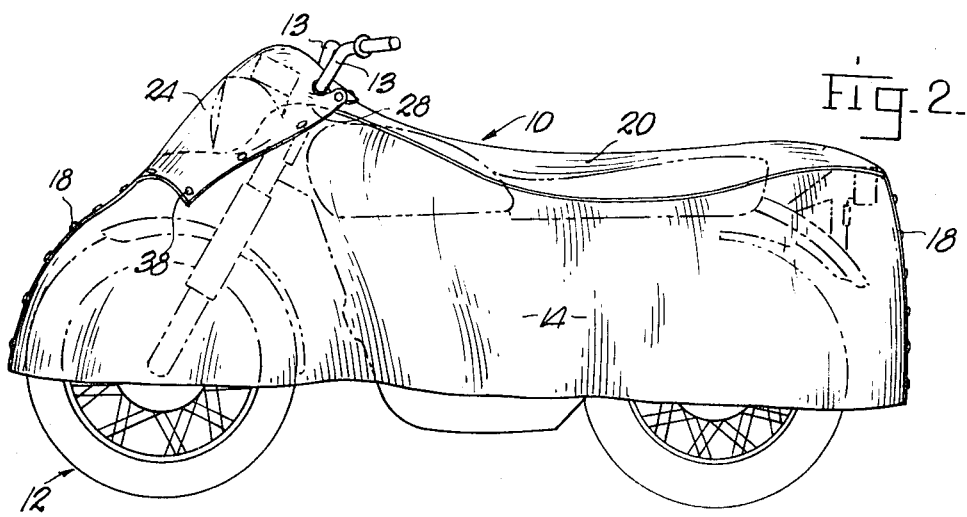
Fig. 2.
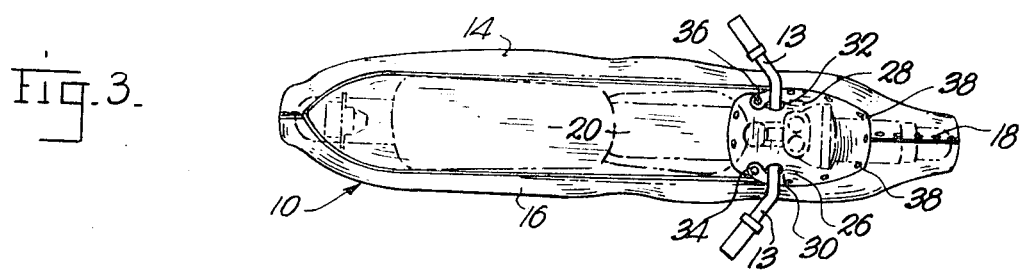
Fig. 3.
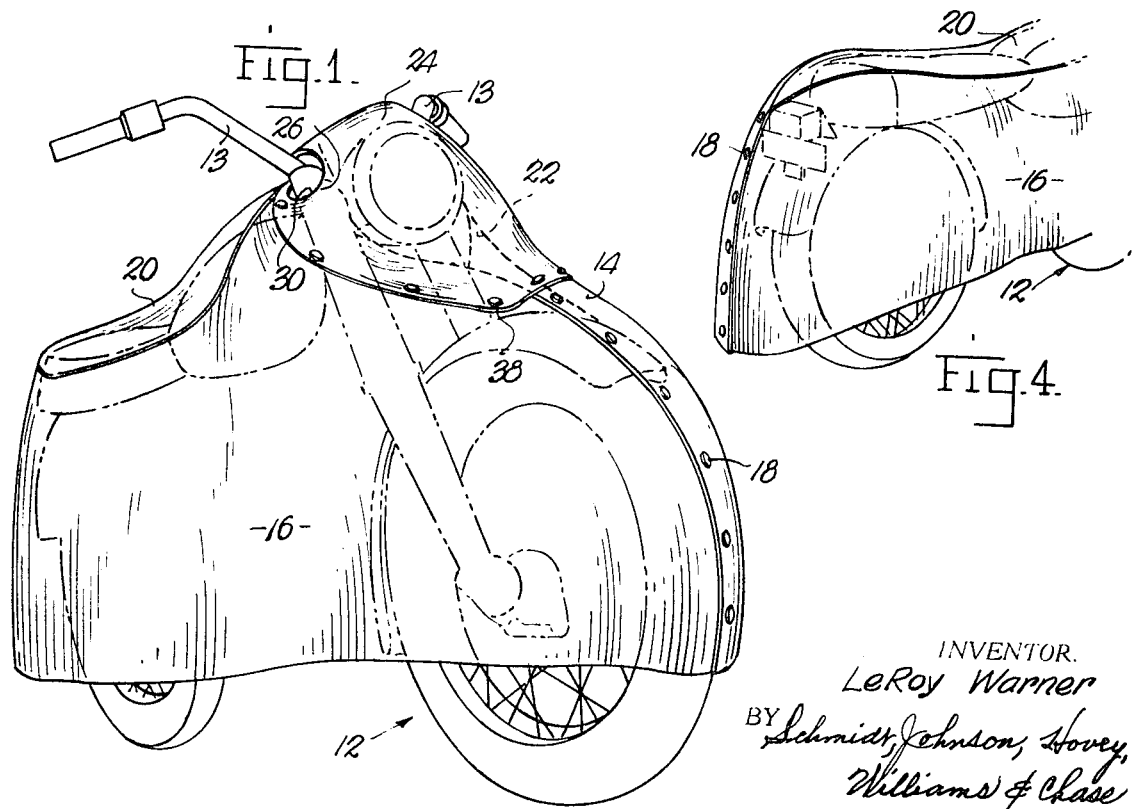
Fig. 1.
Fig. 4.
INVENTOR.
LeRoy Warner
BY Schmidt, Johnson, Hovey,
Williams & Chase
ATTORNEYS.

FOLDABLE COVER STRUCTURE FOR MOTORCYCLE

This invention relates to protective covers for vehicles and, more particularly, to a cover for a cycle such as a two-wheeled motorbike.

Bicycles and tricycles are conventionally constructed with a pair of handlebars which project upwardly from the front wheel and then laterally toward the operator's seat for steering of the vehicle. This construction has heretofore presented problems in providing protective covers for such a vehicle in that a cover which is supported by the handlebars is susceptable to damage from the relatively sharp handlebar projections and, in any event, is subject to wear at the points of contact with the handlebars.

Covers which do not overlie the handle bars have heretofore not provided the desirable protection for the cycle. Adequate coverage and protection is essential when the cycle is motorized in order to protect the engine and other parts which are subject to damage from dirt and moisture.

It is, therefore, an object of the present invention to provide a protective cover for a cycle which is not supported by the handlebars and, therefore, avoids points of stress and wear on the cover but which surrounds the handlebars in sufficiently close relationship to preclude the entrance of moisture underneath the cover.

Another object of the invention is a cycle cover which closely fits the vehicle being protected yet which is easily secured or detached from the vehicle.

A further object of the invention is a cycle cover which can be easily constructed from a flexible material and which will, therefore, conform to the configuration of a cycle being covered, thus assuring proper fit and facilitating protection from moisture, wind and dirt.

In the drawing:

FIG. 1 is a perspective view of a cycle with the protective cover in place;

FIG. 2 is a side elevational view of the vehicle of FIG. 1;

FIG. 3 is a top plan view illustrating how the three flexible panels of the protective cover cooperate to fully enclose the cycle; and FIG. 4 is a fragmentary, end perspective view illustrating the fastening means for securing the two operating portions of one of the panels.

Referring initially to FIGS. 2 and 3, it is seen that the protective cover 10 for a cycle such as a two-wheeled motorbike 12 having a pair of handlebars 13 projecting upwardly from its front wheel, includes a first panel of flexible material comprised of a first panel portion 14 and a second panel portion 16, which portions are releasably secured one to the other by a plurality of fasteners 18 disposed at each end of the cycle 12.

While the first panel of flexible material completely surrounds the cycle 12, a second panel 20 of flexible material is disposed in overlying relationship to the cycle 12 and is secured to the respective portions 14 and 16 of the first flexible panel. As is best illustrated in FIGS. 1 and 2, the second flexible panel 20 also extends in partial surrounding relationship to the uppermost portion of the cycle for purposes to be made clear hereinafter.

The first flexible panel has an opening 22 therein for the handlebars 13. This opening 22 is closed by a third panel 24 of flexible material. The third panel 24 has first and second sections 26 and 28 which present slits 30 and 32 for receiving the individual handlebars 13. A pair of snaps 34 and 36 provide means for securing each of the sections 26 and 28 in close surrounding relationship to their respective handlebars 13. Finally, a plurality of fasteners 38 having complemental components disposed around the periphery of the opening 22 and around the periphery of the third panel 24 provide means for securing the latter to the first and second portions 14 and 16 of the first panel and the second flexible panel 20.

When the protective cover 10 is disposed over the cycle 12 in the manner illustrated in the drawing, it will be appreciated that the cycle is well protected even though the handlebars 13 project out from under the cover. While the construction of the cover 10 with two panel portions 14 and 16 surrounding the cycle, which portions are secured by the fasteners 18, substantially precludes the entrance of moisture beneath the cover, it is preferable to include the third flexible panel 14 to close the opening 22. This third panel 24 is quickly and easily secured to the portions 14 and 16 as well as the second panel 20 by inserting the handlebars 13 into the respective slits 30 and 32, then securing the snaps 34 and 36 after which the fasteners 38 may likewise be secured.

The provision of fasteners 18 at both the front and rear of the cycle 12 permits the quick removal or securing of the panel portions 14 and 16, and the flexibility of these panel portions allows them to conform to the configuration of the cycle thus assuring a proper fit, while also facilitating proper protection from wind, moisture and dirt. By constructing the flexible panel 20 so as to partially surround the upper portion of the cycle, the seam or line of juncture between the first and second flexible panels is disposed in a substantially vertical plane thereby precluding moisture from collecting at this point and possibly leaking through to the cycle 12 beneath the cover 10.

Another advantage of the cycle cover 10 is that as a result of its construction from a flexible material, it can be readily folded into a small package which is easily accommodated in the saddlebags commonly found on a motorbike such as 12, or simply placed upon the seat of the cycle and secured by a fastening band.

While in the cycle 12 a fork element supports the handlebars 13 and extends upwardly uninterrupted from the front wheel to the individual bars, it will be appreciated that the invention is also applicable to a cycle wherein the handlebars 13 converge into a single steering support which, in turn, is held by a fork element. Thus the term "pair of handlebars" as used throughout this application is meant to include the latter-mentioned construction.

Having thus described the invention, what is claimed as new and desired to be secured by Letters Patent is:

1. A protective cover for a cycle having a pair of handlebars, said cover comprising:
    a first panel of flexible material for disposition in surrounding relationship to the cycle,
    said first panel comprising first and second panel portions and means for releasably securing one of said portions to the other of said portions,
    said first panel having an opening therein for said handlebar;
    a second panel of flexible material for disposition in overlying relationship to said cycle and secured to said first panel;
    a third panel of flexible material for closing said opening in said first panel,
    said third panel having first and second sections presenting slits for receiving the individual bars of said pair of handlebars;
    means for securing each of said first and second sections in close surrounding relationship to a respective handlebar; and
    means for securing said third panel to each of said first panel and said second panels.

2. A protective cover as set forth in claim 1, wherein said second panel extends into partial surrounding relationship to the cycle.

3. A protective cover as set forth in claim 2, wherein said means for securing said first and second panel portions includes a plurality of fasteners disposed at each end of the cycle.

4. A protective cover as set forth in claim 3, wherein said means for securing said third panel to each of said first and second panels comprises a plurality of fasteners having complemental components disposed around the periphery of said opening in the first panel and around the periphery of said third panel.

* * * * *